United States Patent Office 3,577,409
Patented May 4, 1971

3,577,409
2-RCH₂NH-4-X-5-SULFAMYLBENZOIC ACIDS
Edward J. Cragoe, Jr., Lansdale, Pa., assignor to Merck & Co., Inc., Rahway, N.J.
No Drawing. Filed Dec. 7, 1965, Ser. No. 512,217
Int. Cl. C07d 7/04, 15/04, 15/12
U.S. Cl. 260—239.6     6 Claims

ABSTRACT OF THE DISCLOSURE 4-chloro or bromo-5-sulfamyl-N-substituted-anthranilic acid diuretic compounds, having as N-substituents a saturated pyranylmethyl, a dioxolanylmethyl, or a dioxanylmethyl group are described. These products are prepared by the reaction of 2,4-dihalo-5-sulfamylbenzoic acid and $RCH_2NH_2$ where R is a tetrahydropyranyl, a dioxolanyl or a dioxanyl group.

---

This invention relates to a group of novel compositions useful in diuretic and saluretic therapy and more particularly to compounds characterized as 2-RCH₂NH-4-X-5-sulfamylbenzoic acids having the general formula:

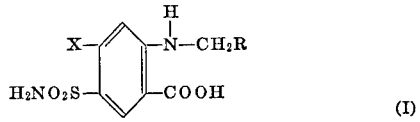

(I)

where X is chloro or bromo and R is selected from the group consisting of 5 or 6 membered carbocyclic radicals containing one annular oxygen atom or two non-adjacent oxygen atoms, wherein the nuclei are either unsubstituted or bear a methyl substituent, for example, 2-tetrahydrofuryl, 2-tetrahydropyranyl, 3-tetrahydropyranyl, 4-dioxolanyl, 4-methyl-2-m-dioxanyl, 4-methyl-4-m-dioxanyl and 2-p-dioxanyl.

The compounds of this invention have shown diuretic and saluretic activity and each can be prepared as products of the following reaction:

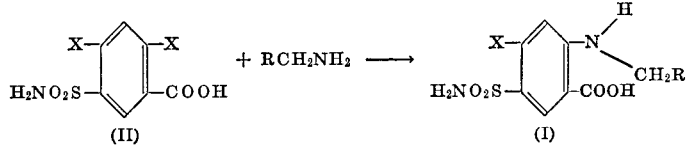

where R and X are selected from among the previously described radicals.

The desired starting materials useful in the novel synthesis of the new compounds of this invention are either known and available or can be prepared by various known methods.

The reaction between the amine and the appropriate 2-chloro(or bromo)-4-X-5-sulfamylbenzoic acid (II) is preferably carried out at a moderately elevated temperature preferably in the range of about 60° C. to about 160° C. The reaction is carried out in a suitable solvent for a sufficient period of time for the replacement of the 2-chloro or bromo group by the amino group. The product (I) is recovered generally by pouring the reaction mixture into a cold 2 N hydrochloric acid solution with stirring. The product, which is insoluble, may be separated from the aqueous solution by filtration and further purified by recrystallization, if desired.

The following are specific examples of the preparation of various of the compounds described generally above. Each of the compounds of this invention are useful chemotherapeutic agents particularly because of its diuretic and/or saluretic property. The compounds are capable of being administered in therapeutic dosages in the form of tablets or in any other conventional form as the compounds are effective upon oral administration as well as by injection.

The compounds of this invention are capable of being utilized in injectable solutions in amounts effective for diuretic or saluretic therapy by dispensing or dissolving the solid compound in any convenient injectable vehicle.

EXAMPLE 1

DL-2-tetrahydrofurfurylamino-4-chloro-5-sulfamylbenzoic acid

A mixture of 2,4-dichloro-5-sulfamylbenzoic acid, (9.45 g., 0.035 mole) tetrahydrofurfurylamine (14.16 g., 0.14 mole) and 2-ethoxyethanol (18 ml.) is refluxed for four hours. The mixture is then allowed to cool and after cooling is poured into 2 N hydrochloric acid (210 ml.) with cooling in ice and stirring. A resulting yellow solid is collected from the hydrochloric solution, washed with water and dried. The dry product yield is 9.62 gm. Three recrystallizations from a 33% ethanol solution give nearly white needles having a melting point of 229–230° C.

*Analysis.*—Calculated for $C_{12}H_{15}ClN_2O_5S$ (percent): C, 43.05; H, 4.52; N, 8.37. Found (percent): C, 43.12; H, 4.78; N, 8.23.

EXAMPLE 2

(−)-2-tetrahydrofurfurylamino-4-chloro-5-sulfamylbenzoic acid

Step A: Preparation of (−)-tetrahydrofurfurylamine.— A solution of DL-tetrahydrofurfurylamine (101.15 g., 1 mole) in hot methanol (126 ml.) is added slowly, with stirring to a solution of D-tartaric acid (150.09 g., 1 mole) in hot methanol (357 ml.). The resulting solution is seeded with product (−)-tetrahydrofurfurylamine, allowed to cool slowly and then allowed to stand. After standing overnight, the resulting white solid is collected and dried. After five recrystallizations from methanol, there is obtained 90.6 g. (72% of theoretical) of the product having a melting point of 96–98° C.; $[\alpha]_D^{26}$ −0.899 ($H_2O$). The filtrates from the reaction solution and the first two recrystallizations are reserved for obtaining the (+)-form of the amine.

The hydrogen tartrate salt (85.5 g., 0.34 mole) is dissolved in hot $H_2O$ (128.3 ml.), cooled in ice and treated with solid potassium hydroxide pellets until the separation of the amine layer is complete. The amine is extracted with ether and the combined extracts are dried, first, over solid potassium hydroxide pellets and, finally, over molecular sieves. The ether is distilled at atmospheric pressure through a long column, and the residual oil is fractionally distilled at reduced pressure. The yield of product in the form of a colorless oil is 27.28 g. (80% of theoretical), B.P. 49–50° C./13 mm.; $[\alpha]_D^{27}$ −8.567 ($H_2O$).

Step B: Preparation of (−)-2-tetrahydrofurfurylamino-4-chloro-5-sulfamylbenzoic acid.—A mixture of 2,4-dichloro-5-sulfamylbenzoic acid (9.45 g., 0.035 mole) of (−)-tetrahydrofurfurylamine (14.16 g., 0.14 mole) and 2-ethoxyethanol (18 ml.) is refluxed for four hours and then allowed to cool. The cooled reaction mixture is poured into 2 N hydrochloric acid (210 ml.) with cooling in ice and stirring. The resulting yellow solid is collected, washed with water and dried, yielding 11.21 g. of product. After two recrystallizations from 33% ethanol and one recrystallization from propanol, the product is obtained in the form of white rods, M.P. 235–236° C.; $[\alpha]_D^{25}$ −31.420 (DMF).

Analysis.—Calculated for $C_{12}H_{15}ClN_2O_5S$ (percent): C, 43.05; H, 4.52; N, 8.37. Found (percent): C, 43.04; H, 4.56; N, 8.33.

EXAMPLE 3

(+)-2-tetrahydrofurfurylamino-4-chloro-5-sulfamylbenzoic acid

Step A: Preparation of (+)-tetrahydrofurfurylamine.—The combined filtrates resulting from the purification of the (−)-form of the hydrogen tartrate salt (Example 2, Step A) are concentrated to dryness under reduced pressure. The residue is dissolved in hot water (75 ml.), cooled in ice and treated with solid potassium hydroxide pellets until the separation of the amine layer is complete. The amine is extracted with ether and the combined extracts are dried, first over solid potassium hydroxide pellets and finally over molecular sieves. The ether is distilled at atmospheric pressure, through a long column to give 38.9 g. (77% of theoretical) of the recovered amine which is dissolved in hot methanol (48 ml.) and added, slowly, with stirring to a solution of L-tartaric acid (57.78 g., 0.385 mole) in hot methanol (145 ml.). The resulting solution is seeded with crystalline product allowed to cool slowly and then stand at room temperature.

The white solid which separates is collected and dried. After three recrystallizations from methanol, the yield of hydrogen tartrate salt is 64.6 gm. (67% of theoretical), having a melting point of 96–98° C. and a $[\alpha]_D^{26}$ of +0.984 ($H_2O$).

The hydrogen tartrate salt (62.6 g., 0.25 mole) is dissolved in hot water (93.9 ml.), cooled in ice and treated with solid potassium hydroxide pellets until the separation of the amine layer is complete. The amine is extracted with ether and the combined extracts are dried, first, over solid potassium hydroxide pellets and, finally over molecular sieves. The ether is distilled at atmospheric pressure, through a long column, and the residual oil is fractionated at reduced pressure. The product in the form of a colorless oil is 20.19 g. (80%), B.P. 49–50° C./13 mm. $[\alpha]_D^{27}$ +8.462 ($H_2O$).

Step B: Preparation of (+)-2-tetrahydrofurfurylamino-4-chloro-5-sulfamylbenzoic acid.—The synthesis of (+)-2-tetrahydrofurfurylamino-4-chloro - 5 - sulfamylbenzoic acid then proceeds similar to Example 1. A mixture of 2,4-dichloro-5-sulfamylbenzoic acid (6.08 g., 0.0225 mole), (+)-tetrahydrofurfurylamine (9.10 g., 0.0900 mole) and 2-ethoxyethanol (12 ml.) is refluxed for four hours.

The cooled reaction mixture is poured into 2 N hydrochloric acid (135 ml.) with cooling in ice and stirring. The resulting yellow solid is collected, washed with water and dried. The yield is 6.20 g. After two recrystallizations from 33% ethanol and one from propanol, the product is obtained in the form of white rods, M.P. 235.5–236.5° C. $[\alpha]_D^{25}$ of +31.720 (DMF).

Analysis.—Calculated for $C_{12}H_{15}ClN_2O_5S$ (percent): C, 43.05; H, 4.52; N, 8.37. Found (percent): C, 43.30; H, 4.58; N, 8.49.

EXAMPLE 4

DL-2-(2-tetrahydropyranylmethylamino)-4-chloro-5-sulfamylbenzoic acid 2,4-dichloro-5-sulfamylbenzoic acid (9.45 g., 0.035 mole) and 2-tetrahydropyranylmethylamine (14.16 g., 0.14 mole) in 2-ethoxyethanol (18 ml.) is refluxed for four hours, then cooled and poured into a cold 2 N hydrochloric acid (210 ml.) with stirring. The resulting tan solid (11.28 gm.) is collected and washed with water and dried. After purification by recrystallization first with ethanol (33%) and separately twice with acetonitrile, the product is obtained as white prisms having a melting point of 225–226° C.

Analysis.—Calculated for $C_{13}H_{17}ClN_2O_5S$ (percent): C, 44.76; H, 4.91; N, 8.03. Found (percent): C, 45.03; H, 5.11; N, 8.31.

EXAMPLE 5

2-(3-tetrahydropyranylmethylamino)-4-chloro-5-sulfamylbenzoic acid

This preparation is carried out as described in Example 1 except 3-tetrahydropyranylmethylamine is substituted for tetrahydrofurfurylamine.

EXAMPLE 6

2-(4-dioxolanylmethylamino)-4-chloro-5-sulfamylbenzoic acid

This preparation is carried out as described in Example 1 except that 4-dioxolanylmethylamine is substituted for tetrahydrofurfurylamine.

EXAMPLE 7

2-(4-methyl-2-m-dioxanylmethylamino)-4-chloro-5-sulfamylbenzoic acid

This preparation ic carried out as in Example 1 except that 4-methyl-2-m-dioxanylmethylamine was substituted for tetrahydrofurfurylamine.

EXAMPLE 8

2-(4-methyl-4-m-dioxanylmethylamino)-4-bromo-5-sulfamylbenzoic acid

This preparation is carried out as described in Example 1 except that 4-methyl-4-m-dioxanylmethylamine and 2,4-dibromo-5-sulfamylbenzoic acid are substituted for tetrahydrofurfurylamine and 2,4-dichloro-5-sulfamylbenzoic acid.

EXAMPLE 9

2-(p-dioxanylmethylamino)-4-bromo-5-sulfamylbenzoic acid

This preparation is carried out as in Example 1 except that p-dioxanylmethylamine and 2,4-dibromo-5-sulfamylbenzoic acid are substituted for tetrahydrofurfurylamine and 2,6-dichloro-5-sulfamylbenzoic acid.

Although this invention has been described with respect to specific examples thereof, it will be apparent to one skilled in the art that the invention embraces equivalent derivatives that fall within the scope of the compounds defined generically by the general formula disclosed and described in the foregoing specification and as claimed hereinafter.

What is claimed is:

1. A composition having the formula:

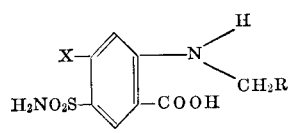

wherein X is selected from the group consisting of chloro and bromo, and R is selected from the group consisting of 2-tetrahydropyranyl, 4-dioxolanyl, 4-methyl-2-m-dioxanyl, 4-methyl-4-m-dioxanyl, and 2-p-dioxanyl.

2. 2-(2-tetrahydropyranylmethylamino) - 4 - chloro-5-sulfamylbenzoic acid.

3. 2-(4-dioxolanylmethylamino) - 4 - chloro - 5 - sulfamylbenzoic acid.

4. 2-(4-methyl-2-m-dioxanylmethylamino) - 4 - chloro-5-sulfamylbenzoic acid.

5. 2-(4-methyl-4-m-dioxanylmethylamino) - 4 - bromo-5-sulfamylbenzoic acid.

6. 2-(p-dioxanylmethylamino) - 4 - bromo-5-sulfamylbenzoic acid.

References Cited

UNITED STATES PATENTS 3,058,882  10/1962  Sturm et al. _____ 260—235.6

FOREIGN PATENTS 965,089  7/1964  England _____ 260—239.6

HENRY R. JILES, Primary Examiner

H. I. MOATZ, Assistant Examiner

U.S. Cl. X.R.

424—229